United States Patent
Galluscio et al.

(10) Patent No.: US 7,529,194 B2
(45) Date of Patent: May 5, 2009

(54) AUTO-SYNCHRONIZATION OF FORMAT DEFINITIONS IN A COMMUTATION/DE-COMMUTATION SYSTEM

(75) Inventors: Anthony P. Galluscio, Indialantic, FL (US); Robert J. Knazik, Cocoa Beach, FL (US); Robert D. Stultz, Melborne, FL (US)

(73) Assignee: Harris Corporation, Melbourne, FL (US)

( * ) Notice: Subject to any disclaimer, the term of this patent is extended or adjusted under 35 U.S.C. 154(b) by 722 days.

(21) Appl. No.: 11/198,058

(22) Filed: Aug. 5, 2005

(65) Prior Publication Data

US 2007/0030933 A1    Feb. 8, 2007

(51) Int. Cl.
*H04L 12/28* (2006.01)
(52) U.S. Cl. .................. 370/252; 370/465; 370/522
(58) Field of Classification Search .............. 370/474, 370/476, 252, 465, 477, 522, 535; 726/27, 726/28, 29
See application file for complete search history.

(56) References Cited

U.S. PATENT DOCUMENTS

| | | | |
|---|---|---|---|
| 4,539,684 A | 9/1985 | Kloker | |
| 5,596,706 A | 1/1997 | Shimazaki et al. | |
| 6,048,366 A | 4/2000 | Ellis et al. | |
| 6,256,602 B1 | 7/2001 | Ellis et al. | |
| 6,282,531 B1 | 8/2001 | Haughton et al. | |
| 6,618,385 B1 | 9/2003 | Cousins | |
| 6,658,586 B1 | 12/2003 | Levi | |
| 6,820,135 B1 | 11/2004 | Dingman et al. | |
| 6,823,328 B2 | 11/2004 | Schreiber | |
| 6,823,470 B2 | 11/2004 | Smith et al. | |
| 6,826,598 B1 | 11/2004 | Titmuss et al. | |
| 2001/0015985 A1* | 8/2001 | Van Grinsven et al. | 370/471 |
| 2003/0039236 A1 | 2/2003 | Uga | |
| 2004/0165571 A1 | 8/2004 | Reznik et al. | |
| 2004/0184480 A1* | 9/2004 | Kangas et al. | 370/466 |
| 2004/0243721 A1 | 12/2004 | Stultz et al. | |
| 2006/0062156 A1* | 3/2006 | Stultz et al. | 370/252 |
| 2006/0098689 A1* | 5/2006 | Stultz et al. | 370/477 |

FOREIGN PATENT DOCUMENTS

EP    1 480 365    11/2004

OTHER PUBLICATIONS

U.S. Appl. No. 10/948,035, filed Sep. 23, 2004, Stultz et al.
U.S. Appl. No. 10/983,482, filed Nov. 8, 2004, Stultz et al.

* cited by examiner

*Primary Examiner*—Min Jung
(74) *Attorney, Agent, or Firm*—Darby & Darby PC; Robert J. Sacco

(57) ABSTRACT

A system and a method for dynamically synchronizing a client (110) to a data source (105). The method can include the step of dynamically selecting a first length of format data to correspond to an amount of bandwidth of a commutated bitstream (115) allocated for synchronization. At least a first portion of a first format definition can be transmitted in the commutated bitstream (115). A size of the first portion can correspond to the first length of format data. The method also can include transmitting a current sentinel (205) in the commutated bitstream (115), the current sentinel (205) identifying a current commutation format of the commutated bitstream (115). An indication (120) can be received from the client that indicates that the client requires the first format definition. The step of transmitting the first portion of the first format definition can be responsive to the client indication.

18 Claims, 2 Drawing Sheets

AUTO-SYNCHRONIZATION OF FORMAT DEFINITIONS IN A COMMUTATION/DE-COMMUTATION SYSTEM

BACKGROUND OF THE INVENTION

1. Statement of the Technical Field

The inventive arrangements relate to the field of data propagation, and more particularly, to sequential transmission of data using multiple data formats.

2. Description of the Related Art

The use of autonomous and otherwise complex equipment continues to proliferate in hostile environments, for example in theaters of combat. Processing of telemetry among such equipment is essential to coordinate mission objectives. It therefore is essential that the equipment effectively communicate in such environments.

Current state of the art of telemetry processing involves grouping measurements, such as pressure, speed, temperature, etc., into a format that can be transmitted in a single commutated bitstream. A static number of such formats are typically available, with each format being optimized for a particular data requirement. A client receiving the commutated bitstream can utilize pre-defined format definitions to separate the commutated bitstream into original measurement components for analysis. When new measurements or combinations of existing measurements are required, additional formats or format modifications need to be added both to a data source generating the commutated bitstream and to clients receiving the bitstream.

Commutated data streams are sometimes implemented in ad-hoc communications systems, which are dynamic in nature. Sources and clients join and leave the network as required. However, updating of commutation format definitions typically requires human intervention, which can greatly inhibit the dynamic nature of ad-hoc communications systems.

SUMMARY OF THE INVENTION

An embodiment in accordance with the present invention concerns a system and a method for dynamically synchronizing a client to a data source. The method can include the step of dynamically selecting a first length of format data to correspond to an amount of bandwidth of a commutated bitstream allocated for synchronization. At least a first portion of a first format definition can be transmitted in the commutated bitstream. A size of the first portion can correspond to the first length of format data.

The method also can include transmitting a current sentinel in the commutated bitstream, the current sentinel identifying a current commutation format of the commutated bitstream. An indication can be received from the client that indicates that the client requires the first format definition. The step of transmitting the first portion of the first format definition can be responsive to the client indication.

The method also can include dynamically selecting a second length of format data to correspond to an amount of bandwidth of a commutated bitstream allocated for synchronization. At least a second portion of the first format definition can be transmitted in the commutated bitstream. A size of the second portion can correspond to the second length of format data.

A cyclic sentinel also can be transmitted in the commutated bitstream. The cyclic sentinel can identify at least a second commutation format forthcoming for the commutated bitstream. An indication can be received from the client that indicates that the client requires a second format definition correlating to the second commutation format. Responsive to the client the indication, at least a portion of the second format definition can be transmitted in the commutated bitstream. A size of the portion of the second format definition can correspond to the first length of format data. In addition, a second length of format data can be dynamically selected to correspond to an amount of bandwidth of a commutated bitstream allocated for synchronization, wherein the size of the portion of the second format definition corresponds to the second length of format data.

A dynamically synchronized communication system can include a data source that dynamically selects a first length of format data to correspond to an amount of bandwidth of a commutated bitstream allocated for synchronization. The data source can transmit in the commutated bitstream at least a first portion of a first format definition, a size of the first portion of the first format definition corresponding to the first length of format data.

The data source can transmit a current sentinel in the commutated bitstream. The current sentinel can identify a current commutation format of the commutated bitstream. The data source also can receive from a client an indication that the client requires the first format definition. The data source can transmit the first portion of the first format definition in response to receiving the indication from the client.

The data source also can dynamically select a second length of format data to correspond to an amount of bandwidth of a commutated bitstream allocated for synchronization, and transmit in the commutated bitstream at least a second portion of the first format definition having a size corresponding to the second length of format data.

The data source also can transmit a cyclic sentinel in the commutated bitstream which identifies at least a second commutation format forthcoming for the commutated bitstream. The data source can receive from a client an indication that the client requires a second format definition correlating to the second commutation format. The data source can transmit in the commutated bitstream at least a portion of the second format definition responsive to the client the indication. A size of the portion can correspond to the first length of format data.

The data source also can dynamically select a second length of format data to correspond to an amount of bandwidth of a commutated bitstream allocated for synchronization. The size of the portion of the second format definition can correspond to the second length of format data.

DETAILED DESCRIPTION OF THE PREFERRED EMBODIMENTS

An embodiment in accordance with the present invention relates to a method and a system for dynamically synchronizing a client to a data source while application data, such as telemetry, continues to be transmitted from the data source in a commutated bitstream. In particular, format data can be included in transmitted packets (or frames) that contain application data. However, an entire commutation format definition may be too large for a particular packet. Accordingly, a length of the format data can be dynamically selected to correspond to a portion of the packet that is allocated for synchronization. A first portion of the commutation format definition having a size corresponding to the dynamically selected length can be transmitted in a first packet as format data. A second portion of the commutation format definition having a selected size then can be transmitted in a second packet as format data, and so on. The client can store application data received from the data source in buffer and the process can continue until the entire commutation format definition has been transmitted to the client. The client then can use the commutation format definition to process the application data.

Sentinels can be transmitted in the packets to identify the commutation format definition required for synchronization. For example, a current sentinel can be transmitted to identify the current commutation format definition and a cyclic sentinel can be transmitted to identify a commutation format forthcoming for the bitstream. As defined herein, a sentinel is any identifier which can be used to identify a particular commutation format definition. For instance, the sentinel can include a commutation format definition identifier, such as an encrypted word, a version identifier, a checksum value that can be used to identify a commutation format definition, and/or any other suitable data which can be used to identify the commutation format definition.

When a client receives a data packet from the data source, the client can process the current and cyclic sentinels to determine whether the client has the proper commutation format definitions. If the client does not, the client can forward an indicator to the data source which alerts the data source which commutation format definitions the client needs. Based on this indicator, as well as indicators the data source receives from other clients, the data source can dynamically prioritize transmission of commutation format definitions.

Figure 1:
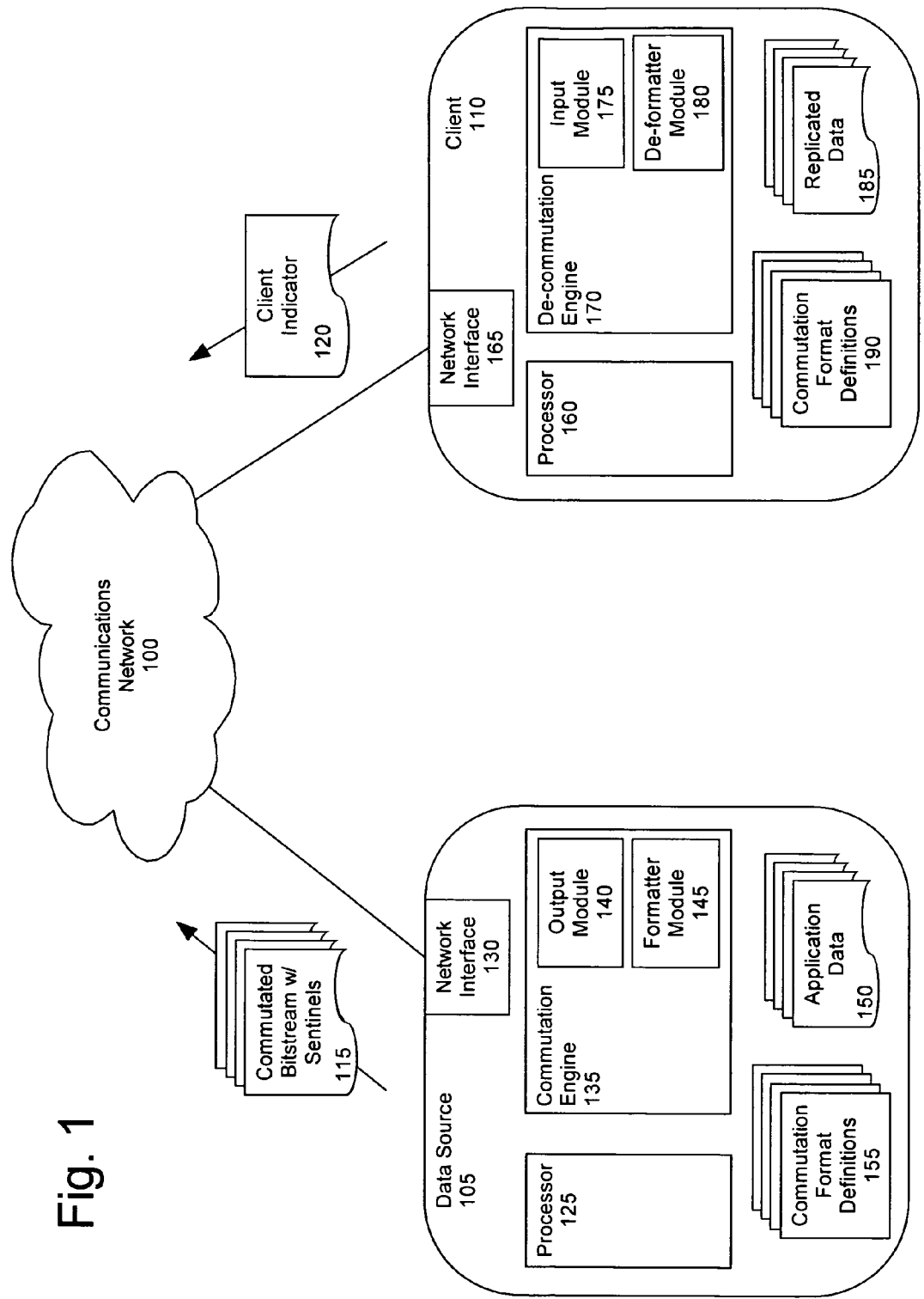
FIG. 1 is a diagram of a communications network which is useful for understanding the present invention.

An example of a communications network 100 which is useful for understanding the present invention is depicted in FIG. 1. The communications network 100 can comprise a wide area network (WAN), a local area network (LAN), a telemetry system, a public switched telephone network (PSTN), a public switched data network (PSDN), an intranet, the Internet, a mobile radio communications network, a cellular telephone communications network, and/or any other suitable communications network.

A data source 105 and a client 110 can be communicatively connected as nodes of the communications network 100. The data source 105 can be a processing device operatively connected to the communications network 100 and which can propagate a commutated bitstream 115 to the client 110. Similarly, the client 110 can be a processing device operatively connected to the communications network 100 which can receive the commutated bitstream 115 from the data source 105. In response to the client 110 determining that it does not have the proper commutation format definition for de-commutating the commutated bitstream 115, the client 110 can generate one or more client indicators 120 that are transmitted to the data source 105 to indicate to the data source 105 the client 110 needs one or more commutation format definitions 190 or definition updates. The client indicators can be a command, an update to an out-of-sync table contained on the data source 105, or any other suitable means for indicating that the client 110 is lacking, or will lack, appropriate commutation format definitions 190 for de-commutating the commutated bitstream 115. In one arrangement, the an out-of-sync identifier can be contained in a packet in a commutated bitstream packet generated by the client 110.

The data source 105 and the client 110 each can be computers such as servers, workstations, personal computers, portable computers, application specific processing systems, or any other devices or systems which can communicate using a commutated bitstream. Further, the data source 105 and the client 110 each can include a respective processor 125, 160. The processors 125, 160 can be central processing units (CPUs), digital signal processors (DSPs), application specific integrated circuits (ASICs), or any other suitable processors. By way of example, the data source 105 and/or the client 110 can be components of emergency response systems, battlefield management systems, satellite systems, security systems, transportation systems, health monitoring systems, environment monitoring systems, energy supply systems, communications systems, or any other systems.

The data source 105 can include a network interface 130 for transmitting and receiving data. The network interface 130 can be, for example, a modem or transceiver. Modems and transceivers are well known to the skilled artisan. In particular, the network interface 130 can transmit the commutated bitstream 115 and receive the client indicators 120 via the communications network 100. The commutated bitstream 115 can be transmitted using any suitable messaging protocol. Such messaging protocols are also known to the skilled artisan.

The data source 105 also can include a commutation engine 135 which generates the commutated bitstream 115. As defined herein, a commutated bitstream is a serial stream of data containing a plurality of interspersed data items. The commutation engine 135 can comprise an output module 140 and a formatter module 145. The formatter module 145 can place application data 150 into the commutated bitstream 115 in accordance with commutation format definitions 155 which define the structure of the commutated bitstream 115.

The commutation format definitions 155 can, for example, define what data items to include in the commutated bitstream 115, define sampling rates to be used for the data items, define the position of the data items in the commutated bitstream 115, define how many bits are allocated for each data item, and/or define any other bitstream parameters. Further, the commutation format definitions 155 can provide conditional formatting. For instance, the commutation format definitions 155 can include Boolean logic and/or conditional statements.

The commutation format definitions 155 can be contained in a data store contained within, or communicatively linked to, the data source 105. The data store can be, for example, an electronic storage medium, an optical storage medium, a magnetic storage medium, a magneto-optical storage medium, or any other type of storage medium which can store data. In one arrangement, the commutation format definitions 155 can be contained in data tables. However, the invention is not limited in this regard. For instance, the commutation format definitions 155 can be stored in text files, binary files, or in any other suitable data structure. Further, the commutation format definitions 155 can be replaced, appended or deleted and new commutation format definitions can be added to change available commutation format options.

In one embodiment, the formatter module 145 can reserve portions of the commutated bitstream 115 for insertion of one or more sentinels, format data and a header. The formatter module 145 can forward the commutated bitstream 115 to the output module 140, which can place the current sentinel, the cyclic sentinel, the header, and at least a portion of the commutation format definition 155 into the commuted bitstream 115. The sentinels, header and commutation format data can be coded in a format known apriori by the client 110. For instance, the format used to insert the sentinels, header and commutation format data can be a format understood universally among the data source 105 and all clients 110. The commutation format definition 155 can be the commutation format definition currently being used to format the application data 150, or a commutation format definition that will later be used to format application data 150. The output module 140 also can apply appropriate messaging protocols to communicate the commutated bitstream 115 over the communications network 100.

In an alternate embodiment, the formatter module can insert one or more of the current sentinel, cyclic sentinel, header and format data into the commutated bitstream 115. For example, the formatter module 145 can insert the sentinels and format data, while the output module 140 inserts the header. Still, the invention is not limited in this regard and such tasks can be delegated to the output module 140, the formatter module 145, or any other suitable modules.

The data source 105 can receive client indicators 120 from one or more clients 110. The client indicators 120 can indicate which commutation format definitions or definition updates are needed by the clients 110, and can be processed for selecting which commutation format definitions 155 or updates to transmit in the commutated bitstream 115. For instance, format definition selection algorithms can be implemented in the data source 105. For example, if a large number of clients indicate that they do not have the appropriate format definition 190 for the current commutation format, the data source 105 can dynamically select the current commutation format definition 155 to insert as format data in the commutated bitstream 115. However, if only low priority clients indicate they lack the current format definition 115, while higher priority clients indicate that they lack format definitions corresponding to forthcoming commutation formats, the data source 105 then can dynamically select the forthcoming commutation format that is lacking in the higher priority clients to insert as format data. If necessary, the data source 105 can transmit the current commutation format 155 in the commutated bitstream 115 at a later time.

During the process of transmitting a commutation format definition 155 or definition update, the data source 105 can continue to receive new client indicators 120. The data source 105 can process the new client indicators 120, along with previously received client indicators 120, to select a next commutation format definition 155 to transmit. Once transmission of the first commutation format definition 155 (or definition update) has been completed, the data source 105 can begin transmitting the second commutation format definition.

Figure 2:
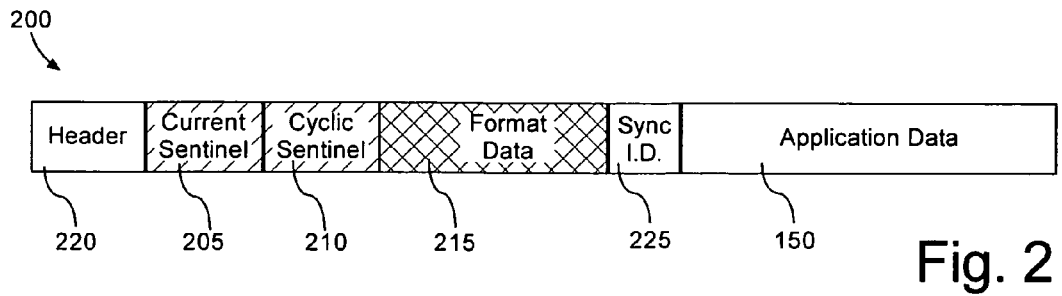
FIG. 2 is a diagram illustrating a serial bitstream data packet which is useful for understanding the present invention.

Briefly referring to FIG. 2, an example of a commutated bitstream packet 200 is shown. The packet 200 can include the current sentinel 205, the cyclic sentinel 210, the format data 215, the application data 150, and a header 220. In one arrangement, the commutated bitstream packet 200 also can include an out-of-sync identifier 225 for notifying other data sources if the data source itself needs new or updated commutation format definitions. Additional information (not shown) also can be included in the packet 200. The packet 200 can be structured in the order shown, or any other desired order. For instance, the application data 150 can precede the format data 215.

The length of the format data 215 can be selected to correspond to an amount of bandwidth allocated for synchronization. The amount of bandwidth can be predetermined, or determined dynamically. For instance, the data source can process an algorithm which considers the amount and priority of application data that needs to be transmitted, and the number and priority of clients needing format definitions. If it is determined that the format data 215 has a relatively low priority, a small amount of format data 215 can be included in the packet 200. On the other hand, if it is determined that the format data 215 has higher priority, a larger amount of format data 215 can be included in the packet 200.

In one arrangement, the amount of format data 215 to include in each packet 200 can be dynamically determined on a packet by packet basis. For example, a first format data length can be selected for a first packet, and a second format data length can be selected for a next packet. The size of the portion of the format definition to be inserted in each packet can be selected based on the format data length for each respective packet. The invention is not limited in this regard, however. For instance, the amount of format data can be determined for groups of packets, or in any other suitable manner.

Referring again to FIG. 1, the client 110 can include a network interface 165 for transmitting and receiving data. The network interface 165 can be used to receive the commutated bitstream 115 and transmit client indicators 120. The client 110 also can include a de-commutation engine 170 which decommutates the commutated bitstream 115 to produce replicated data 185. The de-commutation engine 170 can comprise an input module 175 and a de-formatter module 180.

The input module 175 can receive the commutated bitstream 115 and translate the commutated bitstream 115 to remove messaging protocol information. The input module 175 also can remove the current sentinel, the cyclic sentinel, and the format data for further processing. For instance, the current sentinel can be processed to determine whether the client 110 has the proper commutation format definition 190 to de-format the commutated bitstream 115 as currently formatted. The cyclic sentinel can be processed to determine whether the client 110 has commutation format definitions 190 compatible with forthcoming commutation formats that will be used for the commutated bitstream 115. If the client 110 is lacking any of the necessary commutation format definitions 190, the client can indicate such missing format definitions in the client indicator 120, which is transmitted to the data source 105.

If the format data correlates to a format definition 190 already available to the client 110, the format data can be ignored. However, if the format data correlates to a commutation format definition not currently accessible by the client 110, or a commutation format definition which is not the current version, the client can accumulate the format data at a data store to form, or update, the commutation format definition 190 to which the format data correlates. The client 110 also can store the application data 150 to a data store until the commutation format definition 190 necessary for de-commutating the application data 150 is available, at which time the client 110 can process the application data 150 to generate replicated data 185. Specifically, the de-formatter module 180 can parse application data 150 from the commutated bitstream 115 in accordance with the appropriate commutation format definition 190.

Other details of the commutation and de-commutation engines and associated modules and functions are disclosed in commonly assigned U.S. Pat. Nos. 6,048,366 and 6,256,602; commonly assigned Published U.S. Patent Application No. 2004-0243721 A1; commonly assigned U.S. patent application Ser. No. 10/948,035 filed Sep. 23, 2004; commonly assigned U.S. patent application Ser. No. 10/983,482 filed Nov. 8, 2004; and commonly assigned International Patent Application No. WO 01/55874, the disclosures of which are hereby incorporated by reference in their entirety. In the case of conflict, the present specification, including definitions, will control.

Figure 3:
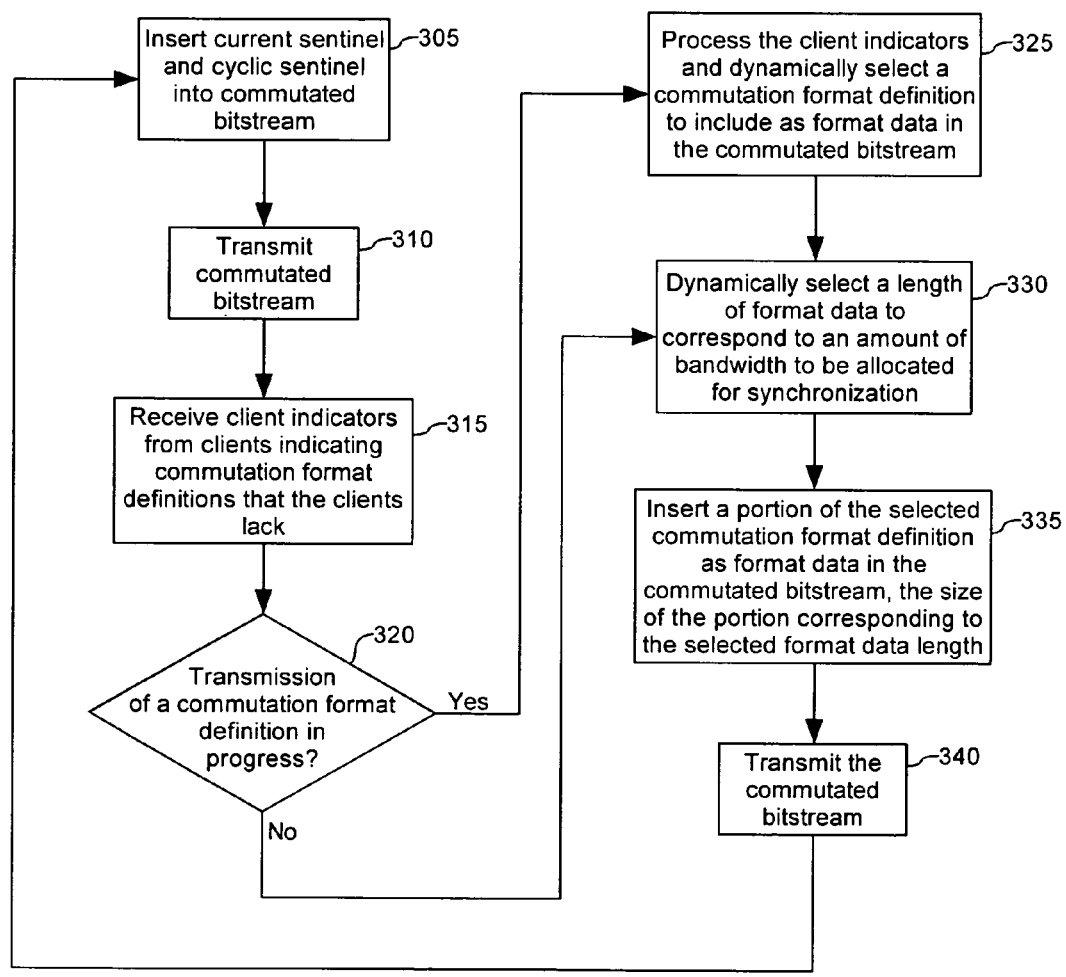
FIG. 3 is a flowchart that is useful for understanding a method of implementing adaptive bandwidth utilization.

A flowchart is shown in FIG. 3 that presents a method 300 for providing auto-synchronization of commutation format definitions. As illustrated therein, the method 300 can include several steps. Beginning at step 305, the data source can insert a current sentinel and a cyclic sentinel into a commutated bitstream, the current sentinel indicating the current commutation format that is being used and the cyclic sentinel indicating a forthcoming commutation format that will be used. The commutated bitstream then can be transmitted to clients, as shown in step 310.

At step 315 the data source can receive client indicators from clients indicating commutation format definitions that the clients lack or for which the clients need updates. Referring to decision box 320 and step 325, if a transmission of a commutation format definition is not currently in progress, the data source can process the client indicators and dynamically select a commutation format definition to include as format data in the commutated bitstream. If, however, the most recent commutation format definition transmission is not yet complete, the data source can continue transmitting sequential portions of the commutation format definition until the entire format definition or format definition updates have been transmitted.

At step 330, the data source can dynamically select a length of format data to correspond to an amount of bandwidth to be allocated for synchronization in one or more packets. Continuing to step 335, the data source can insert a portion of the selected format definition as format data in the commutated bitstream. The size of the portion can correspond to the selected length of format data. At step 340 the data source can transmit the commutated bitstream. The process can continuously repeat while the communications system is operational.

The present invention can be realized in hardware, software, or a combination of hardware and software. The present invention can be realized in a centralized fashion in one processing system, or in a distributed fashion where different elements are spread across several interconnected processing systems. Any kind of processing system or other apparatus adapted for carrying out the methods described herein is suited. A typical combination of hardware and software can be a communications processing system with a computer program that, when being loaded and executed, controls the communications processing system such that it carries out the methods described herein.

The present invention also can be embedded in a computer program product, which comprises all the features enabling the implementation of the methods described herein, and which when loaded in a processing system is able to carry out these methods. Computer program or application program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

We claim:

1. A method for dynamically synchronizing commutation format definitions of a client and a data source so that the client can de-commutate a commutated bitstream generated by the data source, comprising:
   receiving at the data source at least one indicator indicating at least one commutation format definition that the client needs for de-commutating the commutated bitstream;
   responsive to the received indicator, dynamically selecting a first length of format data to correspond to an amount of bandwidth of a portion of a first frame of the commutated bitstream allocated for commutation format definition synchronization;
   inserting at least a first portion of the commutation format definition in the first frame; and
   transmitting in the first frame the first portion of the commutation format definition;
   wherein a size of the first portion of the commutation format definition corresponds to the first length of format data.

2. The method according to claim 1, further comprising transmitting a current sentinel in the commutated bitstream, the current sentinel identifying a current commutation format of the commutated bitstream.

3. The method according to claim 1, wherein said step of transmitting the first portion of the commutation format definition is responsive to said step of receiving the indicator from the client.

4. The method according to claim 1, further comprising:
   subsequent to dynamically selecting the first length, dynamically selecting a second length of format data to correspond to an amount of bandwidth of a portion of a second frame of thea commutated bitstream allocated for commutation format definition synchronization; and
   transmitting in the second frame of the commutated bitstream at least a second portion of the commutation format definition, a size of the second portion of the commutation format definition corresponding to the second length of format data.

5. The method according to claim 1, further comprising transmitting a cyclic sentinel in the commutated bitstream, the cyclic sentinel identifying at least one commutation format forthcoming for the commutated bitstream.

6. The method according to claim 5, further comprising:
   receiving from the client an indication that the client requires a second commutation format definition correlating to the commutation format.

7. The method according to claim 6, further comprising:
   responsive to said step of receiving from the client the indication, transmitting in the commutated bitstream at least a portion of the second commutation format definition.

8. The method according to claim 7, wherein a size of the portion of the second commutation format definition corresponds to the first length of format data.

9. The method according to claim 8, further comprising: dynamically selecting a second length of format data to correspond to an amount of bandwidth of a portion of a second frame of the commutated bitstream allocated for commutation format definition synchronization, wherein the size of the portion of the second commutation format definition corresponds to the second length of format data.

10. A dynamically synchronized communication system, comprising:
    a client;
    a data source communicatively coupled to the client that receives at least one indicator indicating a first commutation format definition that the client needs for de-commutating a commutated bitstream, dynamically selects a first length of format data to correspond to an amount of bandwidth of a portion of a frame of the commutated bitstream allocated for commutation format definition synchronization, inserts at least a first portion of the first commutation formal definition first frame, and transmits in the first frame the first portion of the first commutation format definition, wherein a size of the first portion of the first commutation format definition corresponds to the first length of format data.

11. The system of claim 10, wherein the data source transmits a current sentinel in the commutated bitstream, the current sentinel identifying a current commutation format of the commutated bitstream.

12. The system of claim 10, wherein the data source transmits the first portion of the first commutation format definition in response to receiving the indicator from the client.

13. The system of claim 10, wherein the data source performs at least one operation subsequent to dynamically selecting the first length to dynamically selects a second length of format data to correspond to an amount of bandwidth of a portion of a second frame of the commutated bitstream allocated for commutation format definition synchronization, and transmits in the second frame of the commutated bitstream at least a second portion of the first commutation format definition, a size of the second portion of the first commutation format definition corresponding to the second length of format data.

14. The system of claim 10, wherein the data source further transmits a cyclic sentinel in the commutated bitstream, the cyclic sentinel identifying at least one commutation format forthcoming for the commutated bitstream.

15. The system of claim 14, wherein the data source receives from the client an indication that the client requires a second commutation format definition correlating to the commutation format.

16. The system of claim 15, wherein the data source transmits in the commutated bitstream at least a portion of the second commutation format definition responsive to the indication.

17. The system of claim 16, wherein a size of the portion of the second commutation format definition corresponds to the first length of format data.

18. The system of claim 17, wherein the data source dynamically selects a second length of format data to correspond to an amount of bandwidth of a portion of a second frame of the commutated bitstream allocated for commutation format definition synchronization, wherein the size of the portion of the second format definition corresponds to the second length of format data.

* * * * *